United States Patent [19]
Ohtani

[11] Patent Number: 5,132,601
[45] Date of Patent: Jul. 21, 1992

[54] INDUSTRIAL ROBOT

[75] Inventor: Yukio Ohtani, Kawasaki, Japan

[73] Assignee: Tokico Ltd., Kawasaki, Japan

[21] Appl. No.: 684,671

[22] Filed: Apr. 12, 1991

Related U.S. Application Data

[63] Continuation-in-part of Ser. No. 445,190, Dec. 1, 1989.

[30] Foreign Application Priority Data

Dec. 2, 1988 [JP] Japan .................. 63-305814
Feb. 20, 1989 [JP] Japan .................. 1-39672

[51] Int. Cl.$^5$ .............................................. B25J 19/00
[52] U.S. Cl. ........................... 318/568.1; 318/568.11;
318/567; 901/42; 395/1
[58] Field of Search .................. 318/560-640;
364/573; 901/19-26, 38, 42, 2, 3, 9, 15, 29;
414/730-735

[56] References Cited

U.S. PATENT DOCUMENTS

| | | | |
|---|---|---|---|
| 4,062,455 | 12/1977 | Flatau. | |
| 4,065,001 | 12/1977 | Ohnaka. | |
| 4,408,286 | 10/1983 | Kikuchi et al. | 318/568 |
| 4,445,184 | 4/1984 | Noguchi | 318/568 |
| 4,502,830 | 3/1985 | Inaba et al. | 901/21 X |
| 4,548,097 | 10/1985 | Zimmer | 901/26 X |
| 4,627,786 | 12/1986 | Minematsu et al. | 901/26 X |
| 4,636,138 | 1/1987 | Gorman | 901/21 X |
| 4,637,773 | 1/1987 | Nakashima et al. | 901/21 |
| 4,670,641 | 6/1987 | Porsander et al. | 318/609 X |
| 4,680,519 | 7/1987 | Chand et al. | 318/568 |
| 4,702,668 | 10/1987 | Carlisle et al. | 901/21 X |
| 4,705,243 | 11/1987 | Hartmann et al. | 901/15 |
| 4,706,000 | 11/1987 | Kishi et al. | 318/632 X |
| 4,787,262 | 11/1988 | Kozawa et al. | 901/23 |
| 4,812,104 | 3/1989 | Suzuki | 901/21 X |
| 4,897,586 | 1/1990 | Nakata et al. | 318/568.1 |
| 4,931,617 | 6/1990 | Toyoda et al. | 901/42 |

FOREIGN PATENT DOCUMENTS

| | | |
|---|---|---|
| 232779 | 12/1984 | Japan. |
| 131181 | 7/1985 | Japan. |
| 157195 | 10/1985 | Japan. |
| 50781 | 3/1986 | Japan. |
| 284381 | 12/1986 | Japan. |
| 181886 | 8/1987 | Japan. |
| 88/10179 | 12/1988 | PCT Int'l Appl. . |

Primary Examiner—Paul Ip
Attorney, Agent, or Firm—Hoffmann & Baron

[57] ABSTRACT

Important performances of a robot of articulated type include a wide range of operation and an easy maintenance. In order to improve the performances, it is extremely advantageous to arrange an arm in a cantilever manner, in a point where components are difficult to interfere with each other, a point where confined portions of joints are brought to a single location, and so on. Conventionally, however, the following various drawbacks occur. That is, if the arm is arranged in a cantilever manner, moment loads applied to a plurality of bearings forming respectively the rotational joints increase, and an offset occurs between axes of the respective rotational joints so that computation for control becomes complicated. For this reason, the conventional robot, in which the arm is arranged in a cantilever manner, deteriorates in performance as compared with a robot in which an arm is arranged in a straddle manner, in a service life of the robot, easiness in computation of a control device, and so on. It is a principal object of the present invention to provide a robot in which the aforesaid performances contrary to each other, which are conventionally difficult to be compatible with each other, are highly realized. The invention has advantages in a mounting condition of an arm or a wrist mechanism, that is, a connecting condition thereof and arrangement of a plurality of heavy articles, that is, chiefly a plurality of motors. Further, by combination of the above advantages and an advantage of the wrist mechanism or its drive transmission system, the robot is provided which has other advantages principally required for a machine of this kind and which does not appear conventionally.

19 Claims, 9 Drawing Sheets

INDUSTRIAL ROBOT

CROSS REFERENCE TO A RELATED APPLICATION

This application is a continuation-in-part of our application Ser. No. 445,190 filed Dec. 1, 1989.

BACKGROUND OF THE INVENTION

The present invention relates to an industrial robot of articulated type.

Conventionally, as an automatic machine for conducting operation such as painting or coating, welding or the like in place of operators, there is used an industrial robot in which an operational program is modified or altered thereby being capable of flexibly coping with various works. Among various industrial robots, an industrial robot of articulated type is well utilized which moves closer to man.

The conventional industrial robot of articulated type will be described below with reference to FIG. 10 of the attached drawings.

Figure 10:
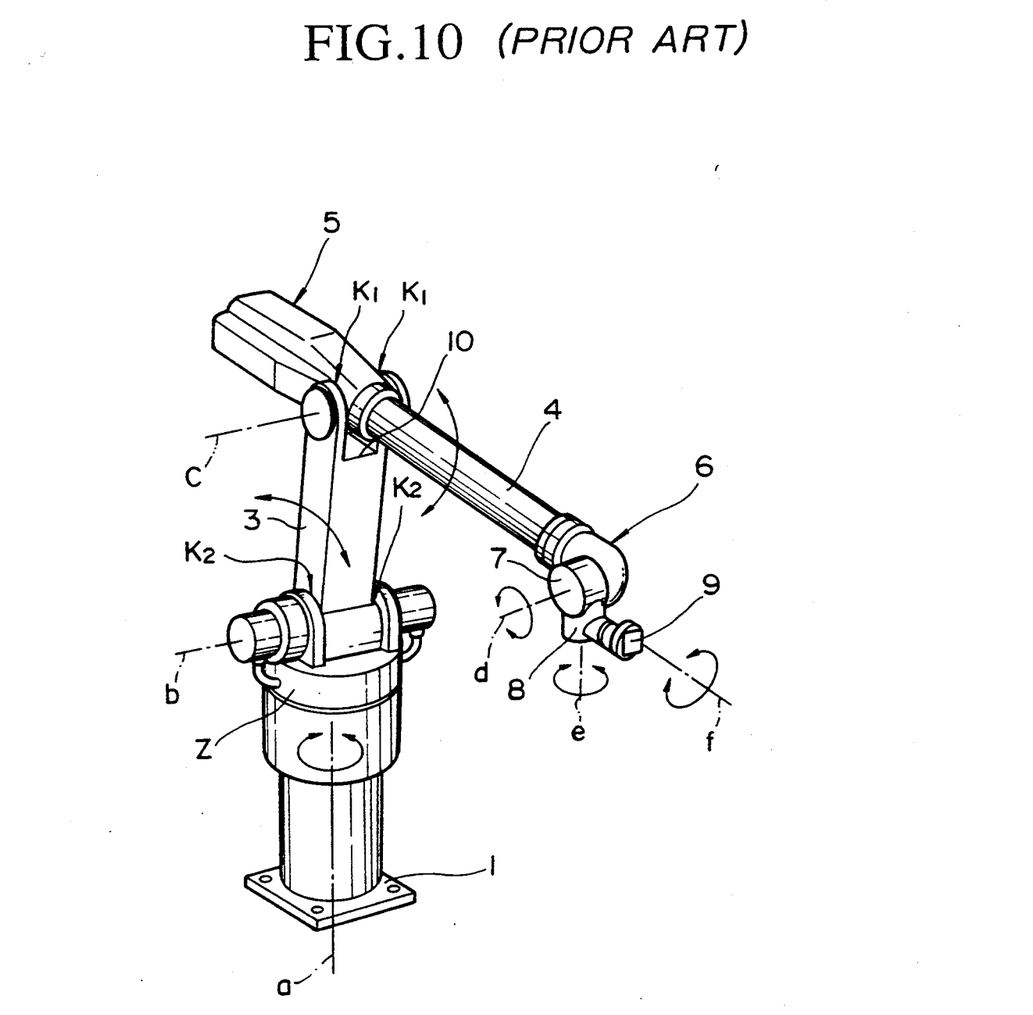
FIG. 10 is a perspective view showing the conventional industrial robot.

FIG. 10 is a perspective view showing the industrial robot of articulated type. The industrial robot has its principal components which include a base 1, a swing base 2 mounted on the base 1 and angularly movable about an axis a, a first arm 3 mounted on the swing base 2 in a straddle manner and angularly movable about an axis b which is perpendicularly intersected with the axis a, a second arm 4 arranged such that its center line exists in a plane including the axis a, the second arm 4 being mounted to a forward end of the first arm 3 in a straddle manner and being angularly movable about an axis c which is parallel to the axis b, a wrist drive section 5 mounted to a rearward end of the second arm 4 so as to extend rearwardly with respect to the axis c, and a wrist mechanism 6 mounted to a forward end of the second arm 4 and driven by a motor which is arranged within the wrist drive section 5.

The wrist mechanisms 6 comprises a case 7 mounted to the forward end of the second arm 4 and angularly movable about an axis d which is parallel to the axis c, a case 8 mounted to the case 7 and angularly movable about an axis e which is perpendicularly intersected with the axis d, and an attaching section 9 having mounted thereon a working tool or the like. The attaching section 9 is mounted to the case 8 and is angularly movable about an axis f which is perpendicularly intersected with the axis e.

Within the wrist drive section 5, three motors for driving the wrist mechanism 6 are arranged in side-by-side relation on a center line of the second arm 4.

As will be apparent from the above description, the industrial robot has six degrees of freedom. Accordingly, it is possible to operate the working tool or the like mounted to the attaching section 9 under such conditions that the working tool or the like is located at any position and is oriented toward any direction if the working tool or the like operates within an operational range. Further, since the motors for driving the wrist mechanism 6 are arranged rearwardly with respect to the axis c of the center of rotation of the second arm 4, the weight of the motors acts as a counterweight so that the counterweight cancels moment due to the weight of the second arm 4 and the weight of the wrist mechanism 6. Thus, the capacity of the motor for driving the second arm 4 can be reduced.

However, the conventional industrial robot described above has points to be improved as follows.

First, the first arm 3 and the second arm 4 are mounted respectively on the swing base 2 and the first arm 3 in a straddle manner. Accordingly, if the first arm 3 or the second arm 4 is angularly moved largely, the first arm 3 and the swing base 2 or the second arm 4 and the first arm 3 interfere with each other. For this reason, the angularly moving angle of the first arm 3 or the second arm 4 is restricted small so that the operational range of the robot is reduced. For instance, in FIG. 10, if the second arm 4 is angularly moved downwardly, the second arm 4 interferes with a recess 10 which is formed at the forward end of the first arm 3. Accordingly, it is impossible for the robot to take such a posture that the center line of the first arm 3 is brought substantially parallel to the center line of the second arm 4. Further, if the second arm 4 is angularly moved upwardly, the lower face of the wrist drive section 5 interferes with the first arm 3. Thus, the robot cannot take such a posture that the center line of the first arm 3 is substantially coextensive with the center line of the second arm 4.

Secondly, there are two confined portions designated by the reference characters $K_1$ and $K_1$, and two confined portions designated by the reference characters $K_2$ and $K_2$ in FIG. 10. For example, when the robot is used in painting operation, the robot is located within atmosphere in which a lot of paint scatters. Thus, paint enters through the confined portions $K_1$ and $K_1$ and $K_2$ and $K_2$. For this reason, maintenance must frequently be done such as cleaning or the like of the interior. Moreover, in order to protect bearings against foreign matters or the like. seal material must be interposed between each pair of members or components. Alternatively, connecting sections must, as a whole, be covered with elastic or resilient material such as, for example, rubber membranes formed into bellows. Thus, the construction is complicated, assembling operation at manufacturing of the robot is difficult, and maintenance operation is not easy such as replacement, cleaning or the like of the aforesaid seal materials and so on.

Thirdly, a plane including the axis e does not include the axis a, and the plane and the axis a are parallel to each other, but are offset from each other by a length by which the case 7 projects from the side surface of the second arm 4. For this reason, in transformation computation between the orthogonal coordinates and the articulated coordinates for controlling the robot in a CP (Continuous Pass) manner, an offset amount must always be considered, so that the computation is complicated. This produces disadvantages such as an increases in a capacity of memory used in computation in a control device, increase of computation time, and so on.

Fourthly, since the first arm 3 and the second arm 4 are mounted respectively on the swing base 2 and the first arm 3 in a straddle manner, the bearings are necessary on both sides of each proximal portions of the first or second arm, which causes the complicated structure and the increased weight thereabout.

Fifthly, it is necessary to arrange cables for providing the motors for driving said wrist mechanism 6 with current, and the cables are usually arranged through said first arm 3. However, since the second arm 4 is supported by the first arm 3 in a straddle manner, it is difficult to draw the cables out from the first arm at a center of the angular movement of the second arm. This means that, when the second arm rotates, the cables are repeatedly extended and released which may cause the cables disconnection.

SUMMARY OF THE INVENTION

It is an object of the invention to provide an industrial robot capable of improving the above-mentioned conventional points of issue and capable of maintaining advantages principally demanded from a machine of this kind. Specifically, it is an object of the invention to provide an industrial robot having the following advantages:

(1) Operational range is large.

(2) Maintenance is easy.

(3) Transformation computation between the articulated coordinates and the orthogonal coordinates is easy.

(4) Heavy articles are arranged in a well-balanced manner, and loads acting upon motors and bearings are low.

(5) Assembling is easy.

(6) It is easy to do teaching operation.

(7) The arrangement of cables is simple, and cables do not interfere with the arm movement.

According to the invention, there is provided an industrial robot comprising:

a swing base angularly movable about an axis A;

a first arm supported by said swing base so as to be angularly movable about an axis B, the axis B having no coextensive relation to said axis A;

a second arm supported by said first arm so as to be angularly movable about an axis C, the axis C having no coextensive relation to said axis B, said second arm being mounted to one side of said first arm in a cantilever manner;

a wrist mechanism supported by a forward end of said second arm so as to be angularly movable about an axis D in a cantilever manner, the axis D having no coextensive relation to said axis C, wherein said robot is used with a working tool mounted to said wrist mechanism;

a plurality of first electric motors for driving said wrist mechanism, said first motors being located on the side opposite to said wrist mechanism with respect to a center of the angular movement of said second arm, said first electric motors, said wrist mechanism and said first arm are arranged at the same side of said second arm; and a second electric motor for driving the angular movement of said second arm, said second electric motor being mounted to the side of said second arm opposite to said first arm.

In the industrial robot according to the invention, the first arm supports the second arm in a cantilever manner at a connection in which its center is the axis C. Thus, even if the second arm is angularly moved largely, the first and second arms do not interfere with each other. Further, the aforesaid portions are brought to a single location at the connection. Thus, the invention has such advantages that the operational range of the second arm is large, that the construction is simple, that the assembling operation is easy, and that the maintenance is easy.

Furthermore, the wrist mechanism, the first electric motors for driving the wrist mechanism and the first arm are arranged on the same side of the second arm, and the second electric motor for driving the angular movement of the second arm is arranged on the side of the second arm opposite to the first arm. Accordingly, weights of the first motors for driving the wrist mechanism and wrist mechanism act so as to cancel load moment applied to a plurality of bearings supporting the second arm due to weights of the second arm, the second electric motor for driving the second arm, and so on. Thus, the invention has such an advantage that the service life of the bearings is long.

Furthermore, the first motors for driving the wrist mechanism are arranged on the side opposite to the wrist mechanism with respect to the center of the angular movement of the second arm. Accordingly, weights of the first motors act as counterweights and act so as to cancel the moment of force about the center of the angular movement occurring due to the weights of the second arm and the wrist mechanism. Thus, the load of the second motor for driving the second arm can be reduced.

Preferably, in the industrial robot, the wrist mechanism comprises a first wrist mechanism portion supported by said forward end of said second arm so as to be angularly movable about said axis D, a second wrist mechanism portion supported by said first wrist mechanism portion so as to be angularly movable about an axis E, the axis E having no coextensive relation to said axis D, an attaching shaft supported by said second wrist mechanism portion so as to be angularly movable about an axis F, the axis F having no coextensive relation to said axis E.

Accordingly, the shaft arrangement of the robot has no offset finally. Further, a space having no components can be formed on the backside of the rotational axis E, that is on the side of the axis A. Thus, transformation computation for CP-controlling the robot can be made easy. Moreover, at teaching operation, an operator can confirm, with the naked eye, a direction of the working tool, a relative position between the working tool and a work, or the like, from the backside of the rotational axis E, that is from the side of the axis A, without interference with the second arm.

Preferably, the industrial robot comprises a case extending from a center of the angular movement of the second arm toward the side opposite to the wrist mechanism. The first electric motors for driving the wrist mechanism are arranged in the case.

Preferably, in the industrial robot, the second arm has a center axis and the first electric motors are spaced above the center axis of the second arm.

In the industrial robot described above, the first motors for driving the wrist mechanism are spaced above the center axis of the second arm. Accordingly, even if the second arm is angularly moved such that the first and second arms are coextensive with each other, the first motors and the first arm do not interfere with each other. Thus, the invention has such an advantage that the operational range of the second arm can further increase.

Preferably, in the industrial robot, among the first electric motors for driving the wrist mechanism, the D-axis motor for driving the angular movement of the wrist mechanism about the axis D is arranged at a location remotest from the center of the angular movement of the second arm.

In the industrial robot described above, among the first electric motors for driving the wrist mechanism, the D-axis motor for driving the angular movement of the wrist mechanism about the axis D is arranged at a location remotest from the center of the angular movement of the second arm. By doing so, among the first electric motors for driving the wrist mechanism, the first electric motor, which is heaviest, is arranged at a location remotest from the center of the angular movement of the second arm. Thus, the action of the first electric motors for driving the wrist mechanism, as counterweights, is exhibited largely. Accordingly, it is possible to further reduce the load of the second motor for driving the second arm.

Preferably, the industrial robot further comprises a plurality of belts arranged within the second arm, wherein the first electric motors for driving the wrist mechanism have their respective driving forces which are transmitted to the wrist mechanism through the belts.

In the industrial robot described above, means for transmitting the driving force of the first motors for driving the wrist mechanism to the same uses the belts which are easy in mounting and demounting. Thus, disassembling and assembling operations of the second arm are made easy. Accordingly, the assembling operation of the second arm is easy, and the maintenance operations such as disassembling, inspection and so on are easy.

DETAILED DESCRIPTION

Figure 1:
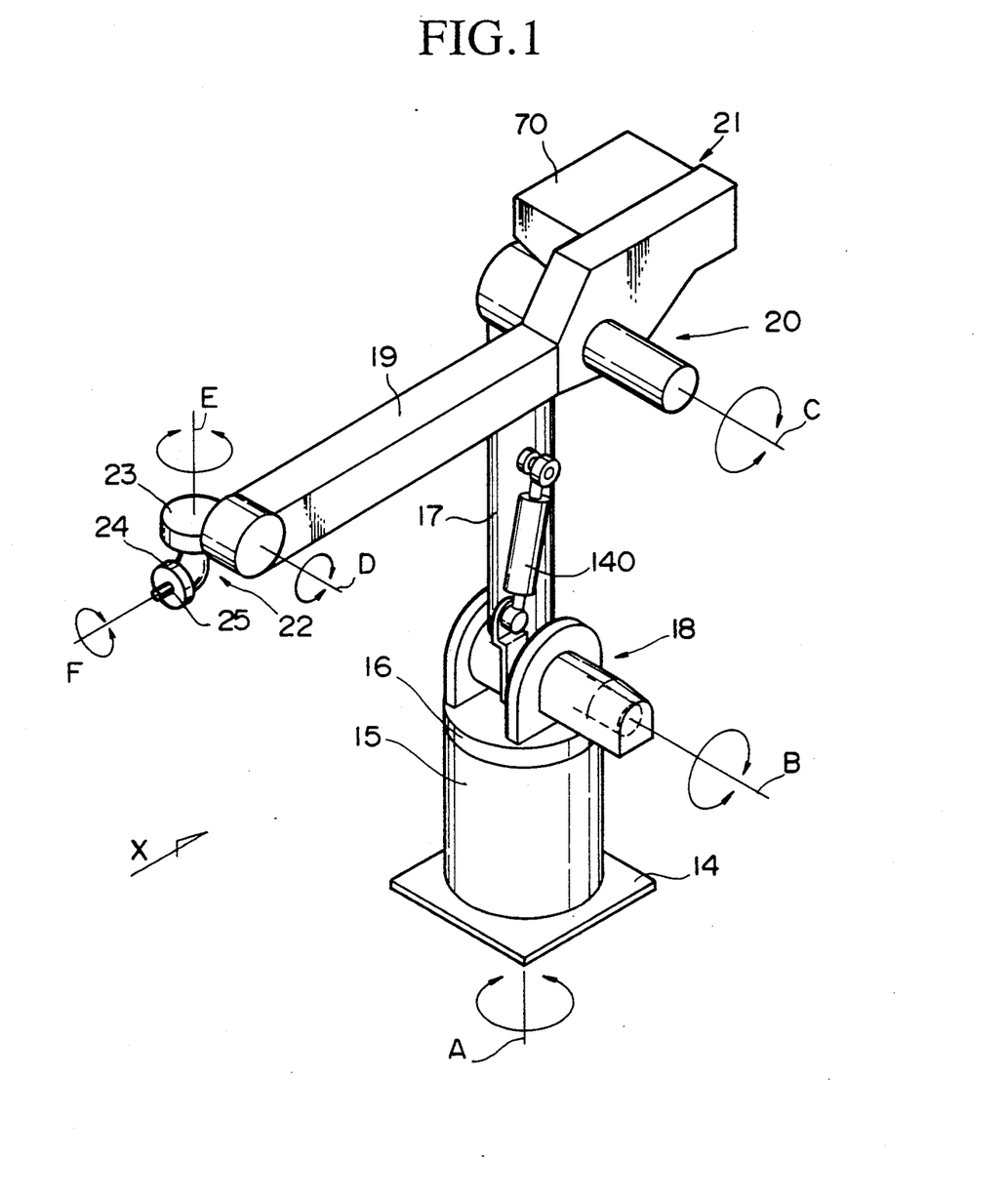
FIG. 1 is a perspective view showing an entire industrial robot according to an embodiment of the invention.
Figure 2:
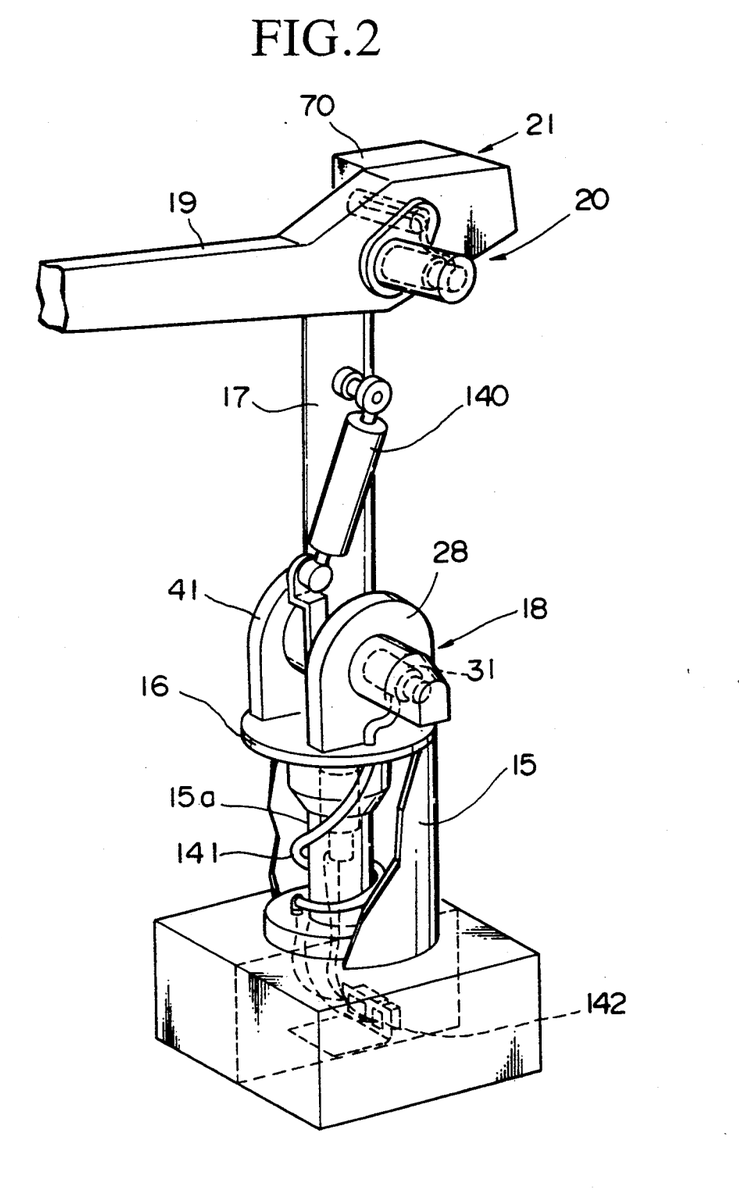
FIG. 2 is a fragmentary perspective view, partially cross sectioned, of a robot of FIG. 1.
Figure 3:
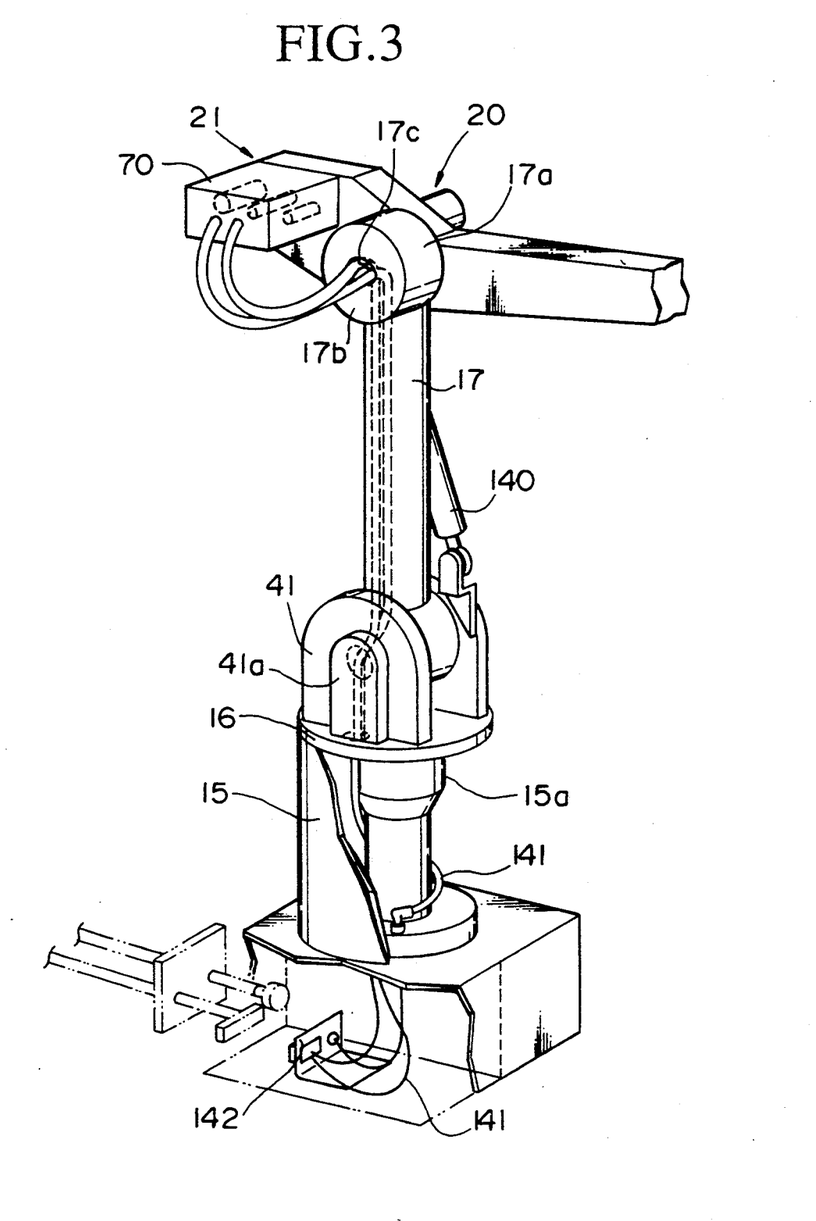
FIG. 3 is another perspective view taken from rear side, partially cross sectional, of a robot of FIG. 1.

Referring to FIGS. 1 to 3, there is shown an entire industrial robot having six degrees of freedom. In FIG. 1, a swing drive section 15 is mounted on a base 14. A swing base 16 is mounted on the swing drive section 15, and is angularly movable about an axis A which is fixed to the base 14. A first arm 17 is mounted on the swing base 16, and is angularly movable about an axis B which is fixed to the swing base 16 and which is perpendicularly intersected with the axis A. A first-arm drive section 18 is mounted on the swing base 16.

A second arm 19 is mounted to a forward end of the first arm 17 and is angularly movable about an axis C which is fixed to the first arm 17 and which is parallel to the axis B. A second drive section 20 is arranged at a connection between the second arm 19 and the first arm 17. Further, a wrist drive section 21 is arranged at a rearward end of the second arm 19. Moreover, a wrist mechanism 22 is arranged at a forward end of the second arm 19. The wrist mechanism 22 includes a case 23, a case 24 and an attaching shaft 25. The case 23 is mounted to the second arm 19 and is angularly movable about an axis D which is fixed to the second arm 19 and which is parallel to the axis C. The case 24 is angularly movable about an axis E which is fixed to the case 23 and which is perpendicularly intersected with the axis D. The attaching shaft 25 has mounted thereto a working tool and so on for causing the robot to do operation. The attaching shaft 25 is angularly movable about an axis E which is fixed to the case 24 and which is perpendicularly intersected with the axis E.

The first arm 17 exists in a plane which includes the axis A. Further, the second arm 19 is mounted to the first arm 17 in a cantilever manner, and the case 23 is mounted to a side surface of the second arm 19 adjacent the first arm 17 in a cantilever manner, so that the axis E exists in a plane which includes the axis A and which is perpendicularly intersected with the axis D.

The construction of each of the swing drive section 15, the first-arm drive section 18, the second-arm drive section 20, the wrist drive section 21 and the wrist mechanism 22 will be described in detail in order.

First, the swing drive section 15 is such that a support mechanism for the swing base 16, a motor for angularly moving the swing base 16, and so on are arranged within the swing drive section 15.

Figure 4:
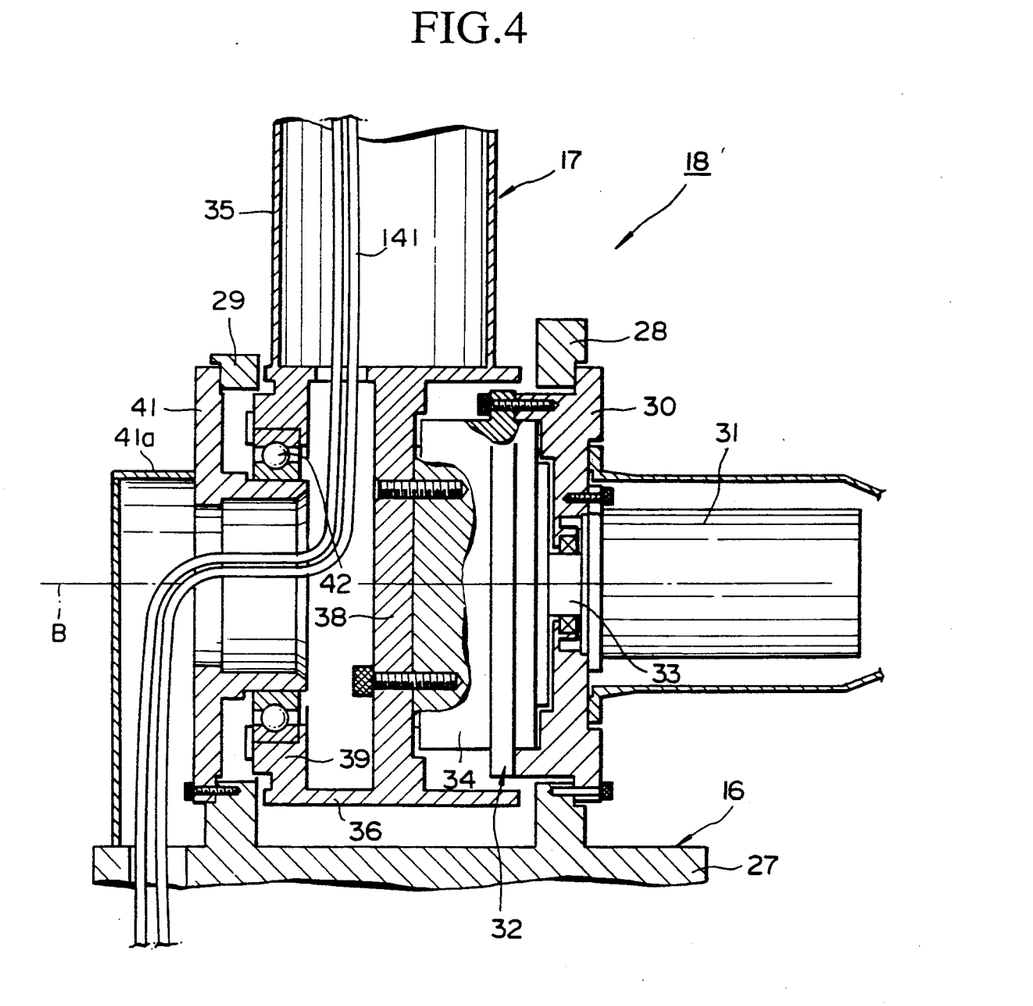
FIG. 4 is a fragmentary enlarged cross-sectional view showing a first-arm drive section of the robot illustrated in FIG. 1.

Next, FIG. 4 is a longitudinal cross-sectional view of the first arm drive section 18 as viewed from a direction indicated by an arrow X in FIG. 1. In FIG. 4, the swing base 16 has a disc portion 27, and a right-hand side-plate portion 28 and a left-hand side plate portion 29 which are formed on an upper face of the disc portion 27 so as to be parallel to each other. The disc portion 27 is arranged on the swing drive section 15 (refer to FIG. 1). As described previously, the swing base 16 is supported by the swing drive section 15 and is angularly moved thereby. A motor 31 is fixedly mounted, through an attaching seat 30, to a right-hand side surface of the right-hand side-plate portion 28 which is formed on the swing base 16. The motor 31 is driven electrically, and has its output shaft which is so arranged as to coincide with the axis B. Further, a speed reducer 32 is fixedly mounted to the left-hand side face of the right-hand side-plate portion 28 through the attaching seat 30. The speed reducer 32 converts rotation low in torque and high in speed into rotation high in torque and low in speed. The speed reducer 32 has an input shaft 33 and an output shaft 34 which are arranged in coextensive relation to each other. The input shaft 33 and the output shaft 34 are so arranged as to coincide with the axis B. A bearing is arranged within the speed reducer 32, and can receive a load in a radial direction or in a thrust direction applied to the output shaft 34.

The input shaft 33 of the speed reducer 32 is mounted to the output shaft of the motor 31 such that rotation of the output shaft of the motor 31 is transmitted to the input shaft 33.

Figure 5:
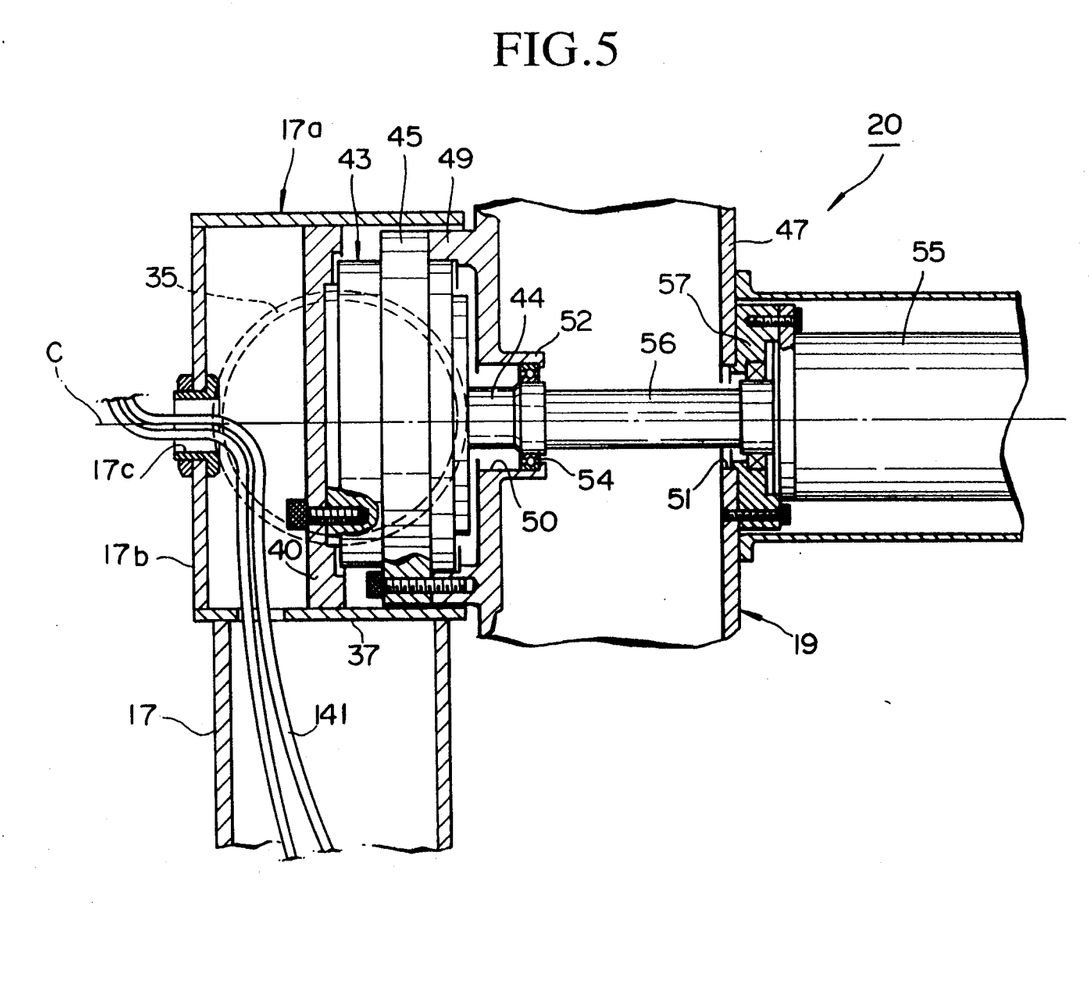
FIG. 5 is a fragmentary enlarged, horizontal cross-sectional view showing a second-arm drive section of the robot, as viewed from the above in FIG. 1.

Furthermore, as described previously, the first arm 17 is arranged on the swing base 16. As shown in FIGS. 4 and 5, the first arm 17 has a cylindrical arm body 35 and a pair of cylindrical portions 36 and 37 which are arranged such that their axes are perpendicularly intersected with an axis of the arm body 35. Further, a pair of plate-like portions 38 and 39 are formed within the cylindrical portion 36 of the first arm 17, and extend along a plane perpendicularly intersected with the axis of the cylindrical portion 36. Moreover, a plate-like portion 40 is formed on the cylindrical portion 37, and extends along a plane which is perpendicularly intersected with the axis of the cylindrical portion 37. The first arm 17 is so arranged that the axis of the cylindrical portion 36 coincides with the axis B of the first-arm drive section 18. The first arm 17 is fixedly mounted to the output shaft 34. The plate-like portion 38 is fixedly mounted to the output shaft 34. The plate-like portion 39 is mounted, through a bearing 42, to a support member 41 which is fixedly mounted to the left-hand side-plate portion 29. Thus, the first arm 17 is angularly movable about the axis B. A balancing member 140 for reducing the static load on the motor 31 is arranged between the first arm 17 and the side-late 28. This balancing member 140 includes an elastic member like a coil spring to compensate the static weight of the first arm 17, the second arm 19, the work handled by the robot and so on.

FIG. 5 is a view in which a horizontal cross-section of the second-arm drive section 20 is viewed from the above. A speed reducer 43 is fixedly mounted to a right-hand side face of the plate-like portion 40 as viewed in FIG. 5, which is formed of the cylindrical portion 37. The speed reducer 43 is similar to the speed reducer 32. The speed reducer 43 has an input shaft 44 and an output shaft 45, and is so arranged that a center line of the input shaft 44 and a center line of the output shaft 45 coincide with the axis C.

Further, as described previously, the second arm 19 is arranged at the right of the cylindrical portion 37 as viewed in FIG. 5. As shown in FIGS. 4 and 5, the second arm 19 is in the form of a box as a whole, and is composed of an arm body 46 substantially in the form of a rectangular parallelepiped, and an arm base 47 formed at an end of the arm body 46. The arm base 47 has a chamber 48 which extends in a direction perpendicularly intersected with a center line G of the arm body 46. As shown in FIG. 5, an annular boss 49 is formed on an opposite side face of the arm base 47 in FIG. 7. A pair of bores 50 and 51 are formed respectively in both side walls of the arm base 47 and are located of the center line of the boss 49. A boss 52 is formed bout the bore 50 and projects into the arm base 47. As shown in FIGS. 4 and 5, an opening 53 is provided in the opposite side face of the chamber 48 in FIG. 7. The second arm 19 is arranged such an orientation that the chamber 48 projects upwardly when the arm body 46 is brought to a horizontal posture. The second arm 19 is also arranged such that the input shaft 44 of the speed reducer 43 is located within the bore 50. The boss 49 is fixedly mounted to the output shaft 45 of the speed reducer 43. The boss 52 is mounted to the input shaft 44 through a bearing 54. Thus, the second arm 19 is angularly movable about the axis C.

Further, a motor 55 is arranged at the right of the arm base 47 as viewed in FIG. 5. The motor 55 is arranged such that its output shaft 56 is located of the axis C within the bore 51. The motor 55 is fixedly mounted to the side wall of the arm base 47 through an attaching seat 57. The output shaft 56 of the motor 55 is mounted to the input shaft 44 of the speed reducer 43 such that rotation of the output shaft 56 of the motor 55 is transmitted to the input shaft 44 of the speed reducer 43.

Figure 6:
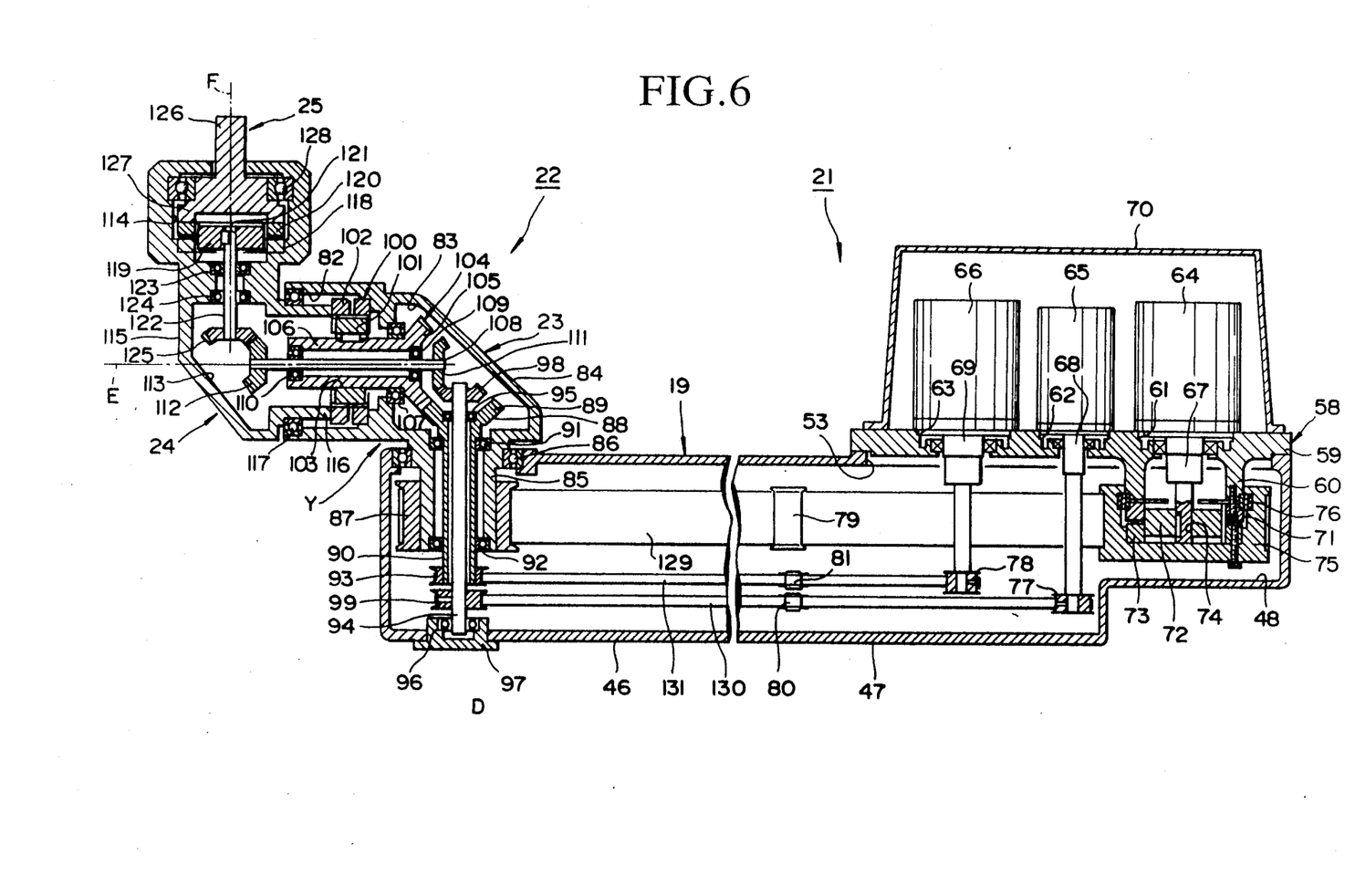
FIG. 6 is an enlarged horizontal cross-sectional view showing a wrist drive section and a wrist mechanism and is a cross-sectional view taken along the line VI—VI in FIG. 7.
Figure 7:
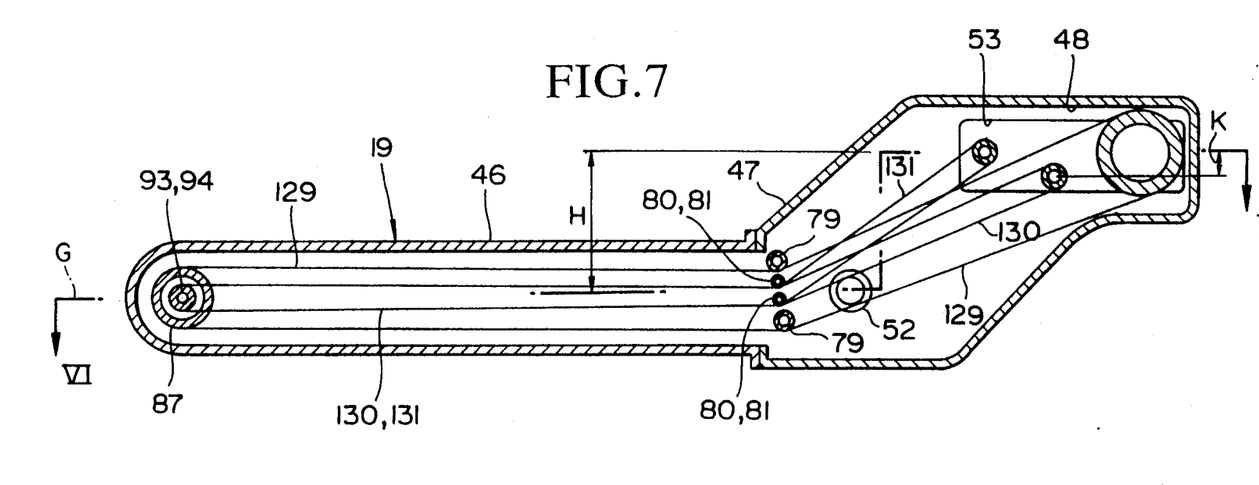
FIG. 7 is a longitudinal cross-sectional view showing a second arm of the robot illustrated in FIG. 1.

FIG. 6 is a horizontal cross-sectional view of the second arm 19, the wrist drive section 21 and the wrist mechanism 22, and is a cross-sectional view taken along the line VI—VI in FIG. 7. Moreover, FIG. 7 is a longitudinal cross-sectional view of the second arm 19.

In FIG. 6, a component designated by the reference numeral 21 as a whole is the aforesaid wrist drive section, and a component designated by the reference numeral 47 is the aforementioned arm base of the first arm 19. An attaching seat 58 is provided on the upper side of the arm base 47 in FIG. 6, that is, on the side thereof adjacent the first arm 17. The attaching seat 58 is composed of a plate portion 58 and a cylindrical boss 60 extending from a side face of the plate portion 59. An attaching bore 61 is formed in the plate portion 59 of the attaching seat 58 such that the attaching bore 61 is located on an axis of the boss 60. Further, a pair of attaching bores 62 and 63 are formed in the plate portion 59 of the attaching seat 58 such that the pair of attaching bores 62 and 63 stand in order in side-by-side relation with respect to the attaching bore 61.

The attaching bores 61 and 63 have their respective center lines which are included in a single plane parallel to the center line G. The attaching bore 62 has its center line which is arranged in spaced relation to the plane by a predetermined size or dimension K toward an opposite side wall of a case 70 in FIG. 6.

The attaching seat 58 is fixedly mounted to the arm base 47 such that the boss 60 is located within the chamber 48 and the plate portion 59 covers the opening 53.

Figure 8:
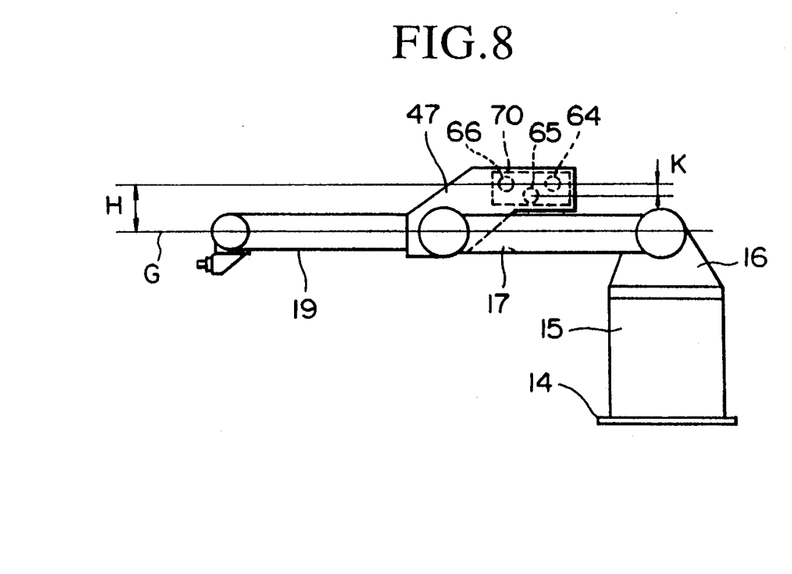
FIG. 8 is a view showing a posture of the robot illustrated in FIG. 1, and is a side elevational view showing the robot.

At this time, as shown in FIG. 8, the centers of the respective attaching bores 61 and 63 are spaced upwardly by H with respect to the center line G of the arm body 46 of the second arm 19, and are arranged on a plane parallel to the center line G.

As illustrated in FIG. 6, three motors 64, 65 and 66 are arranged respectively on the center lines of the attaching bores 61, 62 and 63 of the attaching seat 58. These motors are defined as first electric motors for driving the wrist mechanism 22. The motors 64, 65 and 66 have their respective output shafts 67, 68 and 69 which project respectively from the attaching bores 61, 62 and 63 into the chamber 48. The motor 64 is a D-axis motor for driving the case 23, which is defined as a first wrist mechanism portion, about said axis D, therefore, it is heaviest of three motors 64, 65 and 66. This D-axis motor 64 is arranged at a location remotest from said center of the angular movement of said second arm 19. The motor 66 is an E-axis motor for driving the case 24, which is defined as a second wrist mechanism portion, about said axis E. And the motor 65 is an F-axis motor for driving said attaching shaft 25.

The motors 64, 65 and 66 are arranged such that their respective axial directions are perpendicularly intersected with the second arm 19, and are fixedly mounted to the attaching seat 58. Moreover, the aforesaid case 70 is mounted to the side of the attaching seat 58 opposite to the chamber 48 so as to cover the motors 64, 65 and 66.

Electric cables 141 for providing these first electric motors 64, 65 and 66 with electric current and electric signals to control them are arranged as shown in FIGS. 2 to 5. These cables 141 are connected to terminal couplers 142 arranged at the side wall of the base 14. From the coupler 142, the cables are arranged to run through an upper wall of the base 14 to the inside of the swing drive section 15. The cables are wound around the inner casing 15a of the swing base 15 and further arranged to extend upwardly through a side covering plate 41a into the first arm drive section 18. The cables 141 are further arranged to run through the inside of the first arm 17. At the cylindrical portion 17a arranged at the end of the first arm 17, the cables 141 are drawn out through a hole 17c formed at the center of side wall 17b of the cylindrical portion 17a in a direction opposite to the second arm 19. The cables 141 are connected to each of the first electric motors 64, 65 and 66 after being drawn into the case 70.

The above-described dimension H is set larger than the aforesaid dimension K. As shown in FIG. 8, even if the second arm 19 is angularly moved such that the first arm 17 and the second arm 19 are coextensive with each other, the case 70 and the first arm 17 do not interfere with each other.

A harmonic drive 71 is arranged of the axis of the motor 64 within the chamber 48. The harmonic drive 71 has a wave generator 72 that is an input shaft, and a circular spline 73 that is an output shaft. An attaching bore 74 is formed in the wave generator 72 and is located of the axis thereof. The harmonic drive 71 is fixedly mounted to the boss 60 and is arranged such that the harmonic drive 72 has its axis which coincides with the axis of the motor 64.

The aforementioned output shaft 67 is mounted to the attaching bore 74 of the harmonic drive 71 such that angular movement of the output shaft 67 is transmitted to the wave generator 72.

A pulley 75 for a toothed belt is arranged within the chamber 48 so as to cover an outer periphery of the harmonic drive 71. The pulley 75 is fixedly mounted to the circular spline 73 such that a part of an inner peripheral surface of the pulley 75 is fitted about an outer periphery of the circular spline 73. Further, the pulley 75 is angularly movably mounted to the boss 60 through a bearing 76. Thus, the pulley 75 is angularly movable together with the circular spline 73. A pair of pulleys 77 and 78 are fixedly mounted respectively to the output shafts 68 and 69 of the respective motors 65 and 66.

As shown in FIGS. 6 and 7, three pairs of tension pulleys 79 and 79, 80 and 80 and 81 are arranged within the arm base 47 and adjacent a conjunction between the arm base 47 and the arm body 46. The tension pulleys 79 and 79, 80 and 80 and 81 and 81 are supported by respective shafts, bearings or the like (not shown), and are arranged within the arm base 47 angularly movably. The shafts or the like for supporting respectively the tension pulleys 79 and 79, 80 and 80 and 81 and 81 can be altered in thief respective positions whereby the tension pulleys are adjustable in their respective positions.

In FIG. 6, a component generally designated by the reference numeral 22 is the aforementioned wrist mechanism. A component generally designated by the reference numeral 46 is the aforesaid arm body of the second arm 19. The aforementioned case 23 is arranged on the side of the forward end of the arm body 46 adjacent the first arm 17, that is, on the upper side in FIG. 6. The case 23 is composed of a case body 84 forming a gear chamber 83 having an opening 82, and a cylindrical shaft portion 85 extending from a side surface of the case body 84. The case 23 is arranged such that the shaft portion 85 extends or projects from the side surface of the arm body 46 into the same. The case 23 is mounted to the side wall of the arm body 46 through a bearing 86 so that the case 23 is angularly movable about the axis D. A pulley 87 for the toothed belt is fixedly mounted to the outer periphery of the shaft portion 85 of the case 23. Position of the pulley 87 is determined such that the pulley 87 is confronted to the aforesaid pulley 75 of the wrist drive section 21.

A bevel gear 88 is arranged on the axis D within the shafts portion 85. The bevel gear 88 is hollow in construction having a through bore on the axis, and is composed of a gear portion 89 and a cylindrical shaft portion 90. The bevel gear 88 is arranged such that the shaft portion 90 is located within the shaft portion 85 of the case 23 and the gear portion 89 is located within the gear chamber 83. The bevel gear 88 is mounted to the shaft portion 85 through a pair of bearings 91 and 92 such that the bevel gear 88 is movable angularly about the axis D. A pulley 93 for the toothed belt is fixedly mounted to an outer periphery of an end of the shaft portion 90 of the bevel gear 88 at a location confronted with the aforementioned pulley 78 of the wrist drive section 21.

A shaft 94 is arranged of the axis D within the bevel gear 88. The shaft 94 is in the form of a rod having a circular cross-section, and has one end which projects from the gear portion 89 of the bevel gear 88 into the gear chamber 83. The other end of the shaft 94 extends from the shaft portion 90 of the bevel gear 88 and reaches the side wall of the arm body 46. The shaft 94 is mounted within the bevel gear 88 through a bearing 95, and is mounted to a support member 97 which is fixedly mounted to side wall of the arm body 46 through a bearing 96. Thus, the shaft 94 is angularly movable about the axis D. A bevel gear 98 is fixedly mounted to an end of the shaft 94 adjacent the gear chamber 83. A pulley 99 for the toothed belt is fixedly mounted to the shaft 94 at a location between the pulley 93 and the bearing 96 and confronted to the aforesaid pulley 77 of the wrist drive section 21.

A harmonic drive 100 is arranged within the gear chamber 82 formed in the case 23. The harmonic drive 100 has a wave generator 101 that is an input shaft, and a circular spline 102 that is an output shaft. An attaching bore 103 is formed in the wave generator 101 and is located on an axis thereof. The harmonic drive 100 is arranged such that its axis coincides with the axis E, and is fixedly mounted to the case body 84.

A bevel gear 104 is arranged of the axis E of the gear chamber 83. The bevel gear 104 is hollow in construction having a through bore on its axis, and is composed of a gear portion 105 in mesh with the gear portion 89 of the bevel gear 88, and a cylindrical shaft portion 106. The bevel gear 104 is arranged such that the shaft portion 106 is fitted in the attaching bore 103 of the harmonic drive 100, and the gear portion 105 is in mesh with the gear portion 89 with a predetermined backlash. The bevel gear 104 is mounted to the case body 84 through a bearing 107. Thus, the bevel gear 104 is angularly movable about the axis E. Further, rotation transmitting means such as a key or the like is arranged at fitting between the shaft portion 106 and the attaching bore 103 of the harmonic drive 100, so that rotation of the shaft portion 106 is transmitted to the wave generator 101 of the harmonic drive 100.

A shaft 108 is arranged of the axis E within the bevel gear 104. The shaft 108 is in the form of a rod having a circular cross-section, and has one end which projects from the gear portion 105 of the bevel gear 104. The other end of the shaft 108 projects from the shaft portion 106 of the bevel gear 104. The shaft 108 is mounted within the bevel gear 104 through a pair of bearings 109 and 110 such that the shaft 108 is angularly movable about the axis E. Further, a bevel gear 11 is fixedly mounted to an end of the shaft 108 adjacent the shaft portion 105 such that the bevel gear 111 is in mesh with the bevel gear 98 with a predetermined backlash. Moreover, a bevel gear 112 is fixedly mounted to an end of the shaft 108 adjacent the shaft portion 106.

The aforesaid case 24 is arranged on the side of the case 23 adjacent the opening 82. The case 24 is composed of a case body 115 having a pair of gear chambers 113 and 114, and a cylindrical shaft portion 116 extending from a side wall of the gear chamber 113. The case 24 is arranged such that the shaft portion 116 extends from the opening 82 into the gear chamber 83 and reaches the circular spline 102 of the harmonic drive 100. Further, the case 24 is arranged such that the shaft portion 116 is mounted to the case body 84 through a bearing 117. The shaft portion 116 has its end which is fixedly mounted to the circular spline 102. Thus, angular movement of the circular spline 102 causes the case 24 to be angularly moved about the axis E.

A harmonic drive 118 is arranged within the gear chamber 114 formed in the case 24. The harmonic drive 118 has a wave generator 119 that is an input shaft, and a circular spline 120 that is an output shaft. An attaching bore 121 is formed in the wave generator 119 and is located on its axis. The harmonic drive 118 is arranged such that its axis coincides with the axis F, and is fixedly mounted to the case body 115.

A shaft 122 is arranged on the axis F within the case body 115. The shaft 122 is in the form of a rod having a circular cross-section, and has one end which projects into the gear chamber 113. The other end of the shaft 122 projects into the gear chamber 114. The shaft 122 is mounted angularly movably to the case body 115 through a pair of bearings 123 and 124. A bevel gear 125 is fixedly mounted to an end of the shaft 122 adjacent the gear chamber 113 and is arranged such that the bevel gear 125 is in mesh with the aforementioned bevel gear 112 with a predetermined backlash. The shaft 122 has an end adjacent the gear chamber 114, which is fitted in the attaching bore 121 formed in the wave generator 119 of the harmonic drive 118. Rotation transmitting means such as a key or the like is arranged at fitting between the shaft 122 the attaching bore 121, so that rotation of the shaft 122 is transmitted to the wave generator 119.

The aforementioned attaching shaft 25 is arranged on the axis F and adjacent the forward end of the wrist mechanism 22 within the gear chamber 114. The attaching shaft 25 is in the form of a stepped rod having a circular cross-section, and is composed of a smaller-diameter portion 126 and a larger-diameter portion 127. The attaching shaft 25 is arranged such that the larger-diameter portion 127 is located within the gear chamber 114 and the smaller-diameter portion 126 projects from the gear chamber 114 toward the forward end of the wrist mechanism 22. Thus, the attaching shaft 25 is mounted angularly movably to the case body 115 through a bearing 128. The attaching shaft 25 has an end adjacent the larger-diameter portion 127, which is fixedly mounted to the circular spline 120 of the harmonic drive 118. Thus, angular movement of the circular spline 120 causes the attaching shaft 25 to be moved angularly.

Three endless toothed belts 129, 130 and 131 are arranged within the second arm 19. These endless toothed belts 129, 130 and 131 are mounted respectively to the pulleys 87 and 75, the pulleys 99 and 77, and the pulleys 93 and 78. Further, as shown in FIG. 7, the endless toothed belts 129, 130 and 131 are arranged such that their respective passing loci are bent midway by their respective tension pulleys 79 and 79, 80 and 80 and 81 and 81. Moreover, the endless toothed belts 129, 130 and 131 are arranged such that they do not interfere with the side wall of the second arm 19 and so on. In this manner, the endless toothed belts 129, 130 and 131 make a round or travel. Furthermore, the endless toothed belts 129, 130 and 131 have their respective tensions which are brought respectively to predetermined values by adjustment of positions of the respective pulleys 79 and 79, and 80 and 80 and 81 and 81.

Each of the above-mentioned motors is controlled in its stars, stop and speed and orientation of its operation by a control device (not shown).

The operation of the industrial robot constructed as above will be described below.

First, as the motor or the like arranged within the swing drive section 15 is operated, the swing base 16 is moved angularly. By doing so, components mounted on the swing base 16 including the first arm 17, the second arm 19 and the wrist mechanism 22 of the robot are moved angularly about the axis A. This angular movement will hereinafter be referred to as "swing operation".

As the motor 31 is operated so that its output shaft is moved angularly, the angular movement is converted into low speed and high torque by the speed reducer 32, and is transmitted to the disc-like or plate-like portion 38 formed on the first arm 17, so that the first arm 17 is moved angularly. By doing so, components mounted to the first arm 17 including the first arm 17, the second arm 19 and the wrist mechanism 22 are move angularly about the axis B. This angular movement will hereinafter be referred to as "arm reciprocating operation".

As the motor 55 is operated so that its output shaft 56 is moved angularly, the angular movement is converted into low speed and high torque by the speed reducer 43 and is transmitted to the boss 49 formed on the second arm 19, so that the second arm 19 is moved angularly. By doing so, components mounted to the second arm 19 including the wrist mechanism 22 and the second arm 19 are moved angularly about the axis C. This angular movement will hereinafter be referred to as "arm vertical operation".

As the motor 64 is operated so that its output shaft 67 is moved angularly, the angular movement is converted into low speed and high torque by the harmonic drive 71, and is transmitted to the pulley 87 through the pulley 75 and the endless toothed belt 129, so that case 23 fixedly mounted to the pulley 87 is moved angularly. By doing so, components mounted to the case 23 including the case 23, the case 24 and the attaching shaft 25 are moved angularly about the axis D. This angular movement will hereinafter be referred to as "wrist bending operation".

As the motor 66 is operated so that its output shaft 69 is moved angularly, the angular movement is transmitted to the pulley 93 through the pulley 78 and the endless toothed belt 131, so that the bevel gear 88 fixedly mounted to the pulley 93 is moved angularly. BY the angular movement of the pulley 88, angular movement of the bevel gear 104 is converted into low speed and high torque by the harmonic drive 100 and is transmitted to the shaft portion 116 of the case 24, so that the case 24 is moved angularly. By doing so, components mounted to the case 24 including the case 24 and the attaching shaft 25 are moved angularly about the axis E.

This angular movement will hereinafter be referred to as "wrist swinging operation".

As the motor 65 is operated do that its output shaft 68 is moved angularly, the angular movement is transmitted to the pulley 99 through the pulley 77 and the endless toothed belt 130, so that the shaft 94 fixedly mounted to the pulley 99 is moved angularly. The angular movement of the shaft 94 is transmitted to the shaft 108 through the bevel gear 98 and the bevel gear 111, so that the shaft 108 is moved angularly. The angular movement of the shaft 108 is transmitted to the shaft 122 through the bevel gear 112 and the bevel gear 125, so that the shaft 122 is moved angularly. The angular movement of the shaft 122 is converted into low speed and high torque by the harmonic drive 118, and is transmitted to the larger-diameter portion 127 of the attaching shaft 25, so that the attaching shaft 25 is moved angularly. This angular movement will hereinafter be referred to as "wrist twisting operation".

The control device (not shown) controls start, stop and speed and orientation of operation of each motor, whereby start and stop of the operation and speed and orientation of the operation of each of the aforesaid shafts are controlled. The operations of the shafts include the swing operation, the arm reciprocating operation, the arm vertical operation, the wrist bending operation, the wrist swinging operation and the wrist twisting operation. By doing so, the working tool or the like mounted to the attaching shaft 25 is moved at a predetermined speed, describing a predetermined locus on a space in a three-dimensional manner, within an operational range of each operation. Further, the working tool or the like is oriented at each time in a predetermined direction. Thus, the robot performs desired operations.

The industrial robot according to the embodiment of the invention has the following advantages.

First, the second arm 19 is mounted to the first arm 17 in a cantilever manner. Accordingly, even if the second arm 19 is angularly moved largely, the first arm 17 and the second arm 19 do not interfere with each other. Further, the motors 64 and 66 for the wrist bending operation, the wrist swinging operation and the wrist twisting operation are arranged in spaced relation to the center line of the second arm 19 by the predetermined distance H in such a direction as to avoid interference between the first arm 17 and the case 70 covering the motors 64, 65 and 66. Accordingly, as shown in FIG. 8, even if the second arm 19 is moved angularly such that the first arm 17 and the second arm 19 are arranged in a coextensive manner, the case 70 and the first arm 17 do not interfere with each other. For this reason, it is possible to increase the operational range of the arm vertical operation as compared with the conventional one.

Secondly, the components angularly moved in the arm vertical operation, the wrist bending operation and the wrist swinging operation, that is, the second arm 19, the case 23 and the case 24 are mounted respectively to the components for supporting them in a cantilever manner, that is, respectively to the first arm 17, the second arm 19 and the case 23 in a cantilever manner. By doing so, the aforesaid confined portion is a single in number for each shaft. For this reason, the construction is simple, the assembling operation is made easy, and the maintenance is easy.

Thirdly, the axis E, that is the central axis of the wrist swinging operation, is perpendicularly intersected with the axis D, and is in the plane including the axis A that is the central axis of the swinging operation. Moreover, the second arm 19 is arranged in spaced relation to the plane. Accordingly, the transformation computation for CP-controlling the robot is made easy. Further, at the teaching operation and so on, an operator can confirm, with the naked eye, the direction of the working tool, the relative position between the working tool and a work, and the like, from the backside (that is, the side of the axis A) of the axis E (that is, the case 23), without interference with the second arm 19.

Fourthly, the motors 64, 65 and 66 for driving the wrist mechanism 22 are all arranged of the side opposite to the wrist mechanism 22 with respect to the axis C, and act respectively as counterweights. Further, the motors 64, 65 and 66 act so as to cancel the moment of force about the axis C due to the weight of the second arm 19 and the weight of the wrist mechanism 22. Moreover, among the motors for driving the wrist mechanism 22, the motor 64 for the wrist bending operation which is largest in capacity and heavy in weight, is arranged at the position farthest from the axis C. Accordingly, the action of the motor 164 is exhibited largely, and the load applied to the motor 55 for driving the second arm 19 decreases. For this reason, it is possible to reduce the capacitor of the motor 55.

Fifthly, the wrist mechanism 22 and the motors 64, 65 and 66 for driving the wrist mechanism 22 are so arranged as to extend from the side surface of the second arm 19 toward the first arm 17. For this reason, the weights of the motors 64, 65 and 66 and the weight of the wrist mechanism 22 act so as to cancel the load moment applied to the bearings incorporated in the speed reducer 43 supporting the second arm 19, by the weights of the second arm 19 and the like. By doing so, the service life of the bearings becomes long.

Sixthly, the belts, which are easy in mounting and demounting, are used as means for transmitting the drive forces of the motors 64, 65 and 66 to the wrist mechanism 22. For this reason, the assembling operation of the second arm 19 is easy, and the maintenance operations such as disassembling, inspection and so on are easy.

Seventhly, the components, which are angularly moved in the wrist swinging operation and the wrist twisting operation, that is, the case 24 and the attaching shaft 25 are mounted directly to the output shafts of the speed reducers, that is, directly to the circular splines 102 and 120 of the harmonic drives 100 and 118. Speed reduction is done at the last stage of a chain or links which transmit the angular movement. By doing do, the transmitting means for transmitting the angular movements of the output shafts 68 and 69 of the respective motors 65 and 66 should all transmit the low torque the same as the output shafts 68 and 69. Accordingly, the transmitting means are compact and easy in handling. Specifically, the belts each having its narrow width are used from the motors 65 and 66 to the wrist mechanism 22, and the small bevel gears are utilized within the wrist mechanism 22.

Eighthly, similarly to the above seventh case, the components, which are angularly moved in the wrist swinging operation and the wrist twisting operation, are mounted directly to the output shafts of the speed reducer, and no transmitting means having a backlash is provided between the components and the output shafts of the speed reducers. For this reason, the size or dimension of the backlashes of the components moved angularly due to the backlash of the transmitting means for transmitting the angular movement of the output shaft 68 and 69 of the respective motors 65 and 66 to the harmonic drives 118 and 100 is brought to a value smaller than the dimension of the backlash of the transmitting means by times of the speed reduction ratio of the speed reducers. Thus, the backlashes of the components moved angularly are small, and the repetition accuracy of the wrist swinging operation and the wrist twisting operation is high.

Ninthly, among the three motors 64, 65 and 66 arranged in side-by-side relation on the attaching seat 59 provided on the one side of the second arm 19 for driving the wrist mechanism 22, the motor 65 is arranged such that its axis is spaced away from the plane including the axes of the respective other motors 64 and 66 in common by the predetermined distance K.

For the reason described above, it is possible to reduce the entire arrangement space of the motors longitudinally of the second arm 19 as compared with the conventional one, with the predetermined space for maintenance or the like maintained. Accordingly, it is possible to reduce the moment of inertia as an assembly of the motors 21, 22 and 23 about the axis C.

Figure 9A:
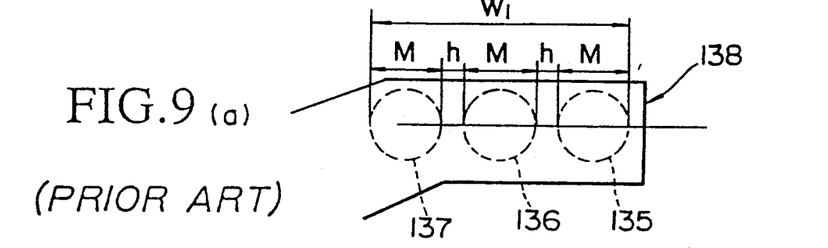
FIGS. 9(a), 9(b) and 9(c) are views showing respectively arrangements of motors for driving the wrist mechanism.

That is, conventionally, as shown in FIG. 9(a), motors 135, 136 and 137 are arranged in a coextensive manner longitudinally of an arm 138. Accordingly, if, for instance, it is assumed that the diameter size of each motor is M uniformly and that the minimum space required for maintenance operation and so on is h, the entire arrangement size $W_1$ is expressed as follows:

$$W_1 = 3M + 2h$$

Figure 9B:
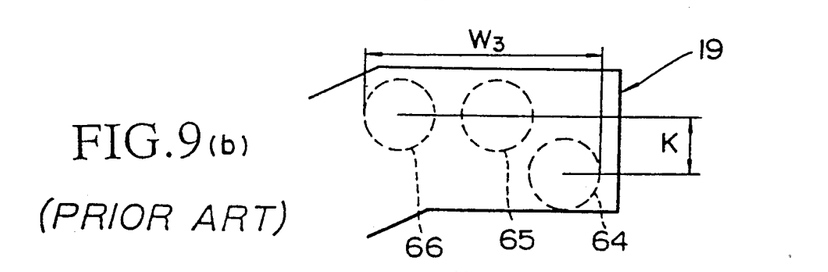
Figure 9C:
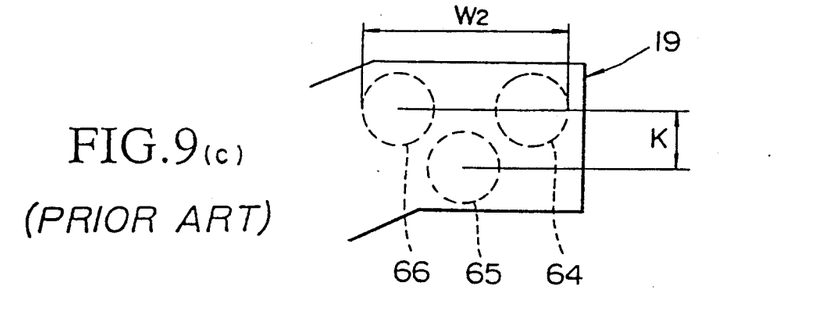

On the contrary, the embodiment of the invention is arranged as shown in FIG. 9(c), and the entire arrangement size $W_2$ is expressed as follows:

$$W_2 = M + 2[(M+h)^2 - K^2]^{\frac{1}{2}}$$

Since $W_2 < W_1$, it is possible to reduce the arrangement space as compared with the conventional one.

By doing so, there are provided the following advantages. That is, the rearward portion of the second arm 19 can be reduced in length and can be small-sized. Further, the moment of inertia of the second arm 19 is reduced so that the capacity of the motor 55 for driving the second arm 19 can be reduced.

Furthermore, among the three motors 64, 65 and 66, the motor 65 arranged inside is arranged in spaced relation to the plane including the axes of the respective other motors 64 and 66 in common by the predetermined distance K. Accordingly, it is possible to secure a space in which another motor is not arranged on either side of any motor. Thus, operations such as brush displacement and so on in case, for example, of a DC motor are made easy extremely.

In connection with the above, in the embodiment of the invention, among the motors 64, 65 and 66, the motor 65 located inside is offset from the plane including the axes of the respective other motors 64 and 66. As shown in FIG. 9(b), however, the motor 64 may be offset. In this case, the entire arrangement size $W_3$ of the motor is expressed as follows:

$$W_3 = 2M + h + [(M+h)^2 K^2]^{\frac{1}{2}}$$

The relationship $W_3 < W_1$ is also obtained.

Furthermore, since the first electric motors, the wrist mechanism and the first arm are arranged at the same side of the second arm, it is possible to arrange the electric cables, which are for providing the first motors with electric current or electric signals for controlling them, running through the first arm and drawn out of the first arm in a direction opposite to the second arm to connect them directly to the first motors. By doing so, the cables are prevented to interfere with the other component of the robot itself, therefore the free movement of the robot is obtained. Further, by drawing the cables out of the first arm at the center axis of rotation of the second arm, cables are prevented from any force to elongate them. Thus, the long period of life of cables are secured which causes a stable operation of the robot.

What is claimed is:

1. An industrial robot comprising:
   a swing base rotatable about an axis A;
   a first arm supported by said swing base so as to be pivotable about an axis B;
   a second arm supported by said first arm so as to be pivotable about an axis C, such that said second arm is mounted at a side of said first arm in a cantilever manner;
   a wrist mechanism on which a working tool can be mounted, said wrist mechanism supported by said second arm so as to be pivotable about an axis D, such that said wrist mechanism is mounted at a forward end of said second arm;
   at least one first electric motor for driving said wrist mechanism, said at least one first electric motor being mounted at a side of said second arm opposite to said forward end of said second arm with respect to said C axis, said at least one first electric motor being located at the same side of said second arm at which said first arm is located;
   a second electric motor for driving said second arm so as to pivot about an axis C, said second electric motor mounted at a side of said second arm opposite to said side thereof whereat said at least one first electric motor is located; and
   at least one electric cable connected with said first electric motor, such that said at least one electric cable exits from said first arm at a center of rotation of said second arm.

2. An industrial robot according to claim 1, wherein said axis A is perpendicular to said axis B, said axes B, C, D are parallel to each other.

3. An industrial robot according to claim 1, wherein said wrist mechanism comprises a first wrist mechanism portion supported by a forward end of said second arm so as to be pivotable about said axis D, a second wrist mechanism portion supported by said first wrist mechanism portion so as to be pivotable about an axis E, the axis E having no coextensive relation to said axis D, an attaching shaft supported by said second wrist mechanism portion so as to be pivotable about an axis F, the axis F having no coextensive relation to said axis E.

4. An industrial robot according to claim 1, wherein said axis E is arranged to be in the same plane as said axis A.

5. An industrial robot according to claim 1, wherein said at least one first electric motor comprises a D-axis motor for driving said first wrist mechanism portion about said axis D, and E-axis motor for driving said second wrist mechanism portion about said axis E, an F-axis motor for driving said attaching shaft.

6. An industrial robot according to claim 5, wherein, among said at least one first electric motor for driving said wrist mechanism, said D-axis motor is arranged at a location remotest from said center of the angular movement of said second arm.

7. An industrial robot according to claim 1, wherein said second arm has a center axis and said at least one first electric motor is spaced above said center axis of said second arm.

8. An industrial robot according to claim 1, further comprising a plurality of belts arranged within said second arm, wherein said at least one first electric motor has its respective driving force transmitted to said wrist mechanism through said belts.

9. An industrial robot according to claim 1 wherein said at least one first electric motor and said second electric motor are synchronous AC motors.

10. An industrial robot according to claim 1 comprising three harmonic drives for reducing speed and increasing torque of the angular movement thereof.

11. An industrial robot according to claim 1 wherein the wrist mechanism comprises two harmonic drives for reducing speed and increasing torque of the angular movement of the wrist mechanism, and the swing base comprises a harmonic drive for reducing speed and increasing torque of the angular movement of the swing base.

12. An industrial robot according to claim 1 wherein the robot is operable for painting.

13. An industrial robot according to claim 1 wherein the second arm comprises at least one toothed endless belt for transmitting driving force of said at least one first electric motor to the wrist mechanism therethrough for driving the wrist mechanism, and the endless belt is made of urethane rubber.

14. An industrial robot according to claim 13 wherein the toothed endless belts are composed of one relatively wide belts and two relatively narrow belts.

15. An industrial robot according to claim 1, wherein said first arm is supported by said swing base so as to be pivotable in a plane about said axis B, such that said plane within which said first arm pivots is intersected by said axis B and is not perpendicular to said axis A.

16. An industrial robot according to claim 1, wherein said second arm is supported by said first arm so as to be pivotable in a plane about said axis C, such that said plane within which said second arm pivots is intersected by said axis C and is not perpendicular to said axis A.

17. An industrial robot according to claim 1, including a plurality of first electric motors mounted at said side of said second arm.

18. An industrial robot according to claim 1, wherein said at least one electric cable is used to supply at least one of electrical power and control signals to said first electric motor.

19. An industrial robot according to claim 1, further comprising at least one second electric cable used to supply at least one of electrical power and control signals to said second electric motor, such that said at least one second electric cable exits from said first arm at said center of rotation of said second arm, said at least one second electrical cable traversing said second arm so as to be connected with said second electric motor.

* * * * *